US010764794B2

(12) United States Patent
Wu

(10) Patent No.: US 10,764,794 B2
(45) Date of Patent: *Sep. 1, 2020

(54) BASE STATION AND COMMUNICATION DEVICE CAN HANDOVER BETWEEN TWO BASE STATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,515

(22) Filed: Jan. 25, 2018

(65) Prior Publication Data

US 2018/0213451 A1 Jul. 26, 2018

Related U.S. Application Data

(60) Provisional application No. 62/450,575, filed on Jan. 26, 2017.

(51) Int. Cl.
| | | |
|---|---|---|
| *H04W 36/00* | (2009.01) | |
| *H04W 36/38* | (2009.01) | |
| *H04W 36/08* | (2009.01) | |
| *H04W 36/14* | (2009.01) | |
| *H04W 36/02* | (2009.01) | |
| *H04W 92/20* | (2009.01) | |
| *H04W 88/06* | (2009.01) | |

(52) U.S. Cl.
CPC ... *H04W 36/0033* (2013.01); *H04W 36/0055* (2013.01); *H04W 36/08* (2013.01); *H04W 36/14* (2013.01); *H04W 36/38* (2013.01); *H04W 36/023* (2013.01); *H04W 88/06* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2018/0146467 A1* | 5/2018 | Kim | H04W 72/0406 |
| 2018/0213589 A1* | 7/2018 | Wu | H04W 36/14 |
| 2018/0249365 A1* | 8/2018 | Cho | H04W 28/02 |
| 2018/0352468 A1* | 12/2018 | Futaki | H04L 29/04 |
| 2019/0037457 A1* | 1/2019 | Jang | H04L 1/1621 |

* cited by examiner

*Primary Examiner* — Charles C Jiang
*Assistant Examiner* — Saad Khawar
(74) *Attorney, Agent, or Firm* — Winston Hsu

(57) ABSTRACT

A first base station (BS) includes: a storage device, configured to store program codes; a first communication interfacing device, configured to transmit signals or receive signals with a second BS; a second communication interfacing device, configured to transmit signals or receive signals with a first communication device; and a processing circuit, configured to execute the program codes. Executing the program codes includes: (a) associating a first Packet Data Convergence Protocol Service Data Unit (PDCP SDU) or an Internet Protocol (IP) packet in the first PDCP SDU with a first PDCP Sequence Number (SN) for the first communication device, the first PDCP SDU including a flow ID and the IP packet; (b) initiating a handover for the first communication device to the second BS; and (c) controlling the first communication interfacing device to only forward the IP packet to the second BS in response to the handover.

11 Claims, 7 Drawing Sheets

BASE STATION AND COMMUNICATION DEVICE CAN HANDOVER BETWEEN TWO BASE STATIONS

CROSS REFERENCE TO RELATED APPLICATIONS

This application claims the benefit of U.S. Provisional Application No. 62/450,575, filed on Jan. 26, 2017, the contents of which are incorporated herein by reference.

BACKGROUND OF THE INVENTION

1. Field of the Invention

The present invention relates to a base station and a communication device can smoothly handover between two base stations.

2. Description of the Prior Art

3GPP recently starts developing a cellular communication technology for a next generation network and a user equipment (UE). Inter-system mobility between a long-term evolution (LTE) network and the new generation network is an issue to be solved in order to provide seamless service continuity for the UE moving between the two different networks.

SUMMARY OF THE INVENTION

Therefore, one objective of the present invention is to provide a base station can provide seamless service to an electronic apparatus.

Another objective of the present invention is to provide a communication device can smoothly handover between two base stations.

One example of the present invention provides a first base station (BS), comprising: at least one storage device, configured to store program codes; a first communication interfacing device, configured to transmit signals or to receive signals with at least one BS; a second communication interfacing device, configured to transmit signals or to receive signals with a plurality of communication devices; at least one processing circuit, coupled to the at least one storage device and the first and second communication interfacing devices, configured to execute the program codes comprising following steps: (a) associating a first PDCP SDU to a first PDCP SN for a first communication device, or associating an IP packet in the first PDCP SDU to a first PDCP SN, wherein the first PDCP SDU comprises a flow ID and the IP packet; (b) initiating a handover for the first communication device to a second BS; and (c) controlling the first communication interfacing device to forward the IP packet but not to forward the flow ID, to the second BS in response to the handover.

Another example of the present invention provides a first base station (BS), comprising: at least one storage device, configured to store program codes; a first communication interfacing device, configured to transmit signals or to receive signals with at least one BS; a second communication interfacing device, configured to transmit signals or to receive signals with a plurality of communication devices; at least one processing circuit, coupled to the at least one storage device and the first and second communication interfacing devices, configured to execute the program codes comprising following steps: (a) controlling the second communication interfacing device to receive a first PDCP PDU from a first communication device, wherein the first PDCP PDU comprises a first PDCP SDU and a first PDCP SN, and the first PDCP SDU comprises a flow ID and an IP packet; (b) initiating a handover for the first communication device to a second BS; and (c) controlling the first communication interfacing device to forward the IP packet but not to forward the flow ID, to the second BS in response to the handover.

Still another example of the present invention discloses a communication device can communicate between a first base station (BS) and a second BS, comprising: a storage device, configured to store program codes; a communication interfacing device, configured to transmit signals or to receive signals; a processing circuit, coupled to the storage device and the communication interfacing device, configured to execute the program codes comprising following steps: (a) associating a first PDCP SDU to a first PDCP SN, wherein the first PDCP SDU comprises a flow ID and an IP packet; (b) controlling the communication interfacing unit to receive a handover command to hand over from the first BS to the second BS; and (c) controlling the communication interfacing device to transmit a first PDCP PDU to the second BS when handing over to the second BS according to the handover command, wherein the first PDCP PDU comprises the IP packet but does not comprise the flow ID.

Based upon above-mentioned embodiments, seamless service continuity for a communication device moving between the two different networks can be provided.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
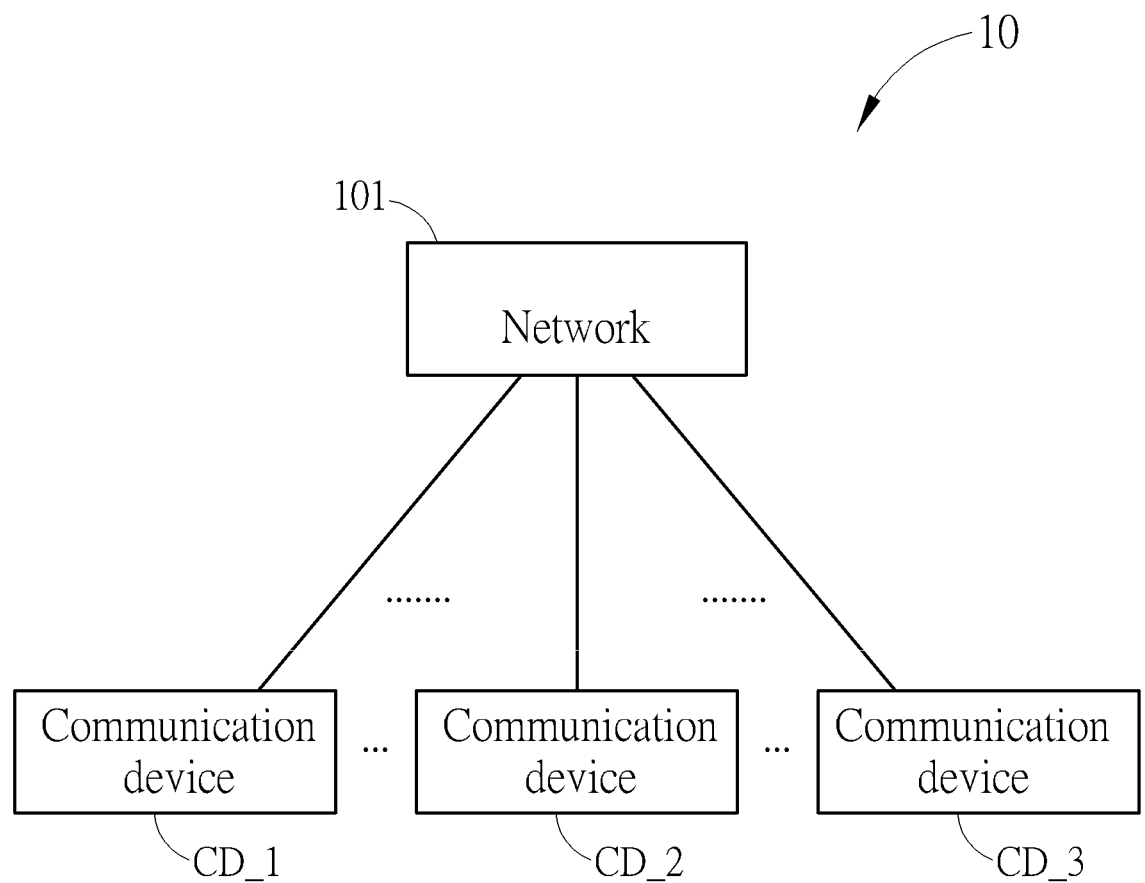
FIG. 1 is a schematic diagram of a wireless communication device according to an example of the present invention.

FIG. 1 is a schematic diagram of a wireless communication system 10 according to an example of the present invention. The wireless communication system 10 is briefly composed of a network 101 and a plurality of communication devices CD_1, CD_2 and CD_3. The network 101 and a communication device may communicate with each other via one or more carriers. The network 101 and the communication device may communicate with each other via one or multiple cells (e.g., one or multiple carriers) belonging to one or multiple base stations (BSs).

In FIG. 1, the network 101 and the communication devices CD_1-CD_3 are simply utilized for illustrating the structure of the wireless communication system 10. Practically, the network 101 includes an evolved universal terrestrial radio access network (E-UTRAN) including at least one evolved Node-B (eNB) and includes a next generation (NG) network including at least one NG BS (e.g., gNB) to communicate with the communication devices. The NG may be a fifth generation (5G). The eNB may connect to an evolved packet core (EPC) network or a NG core (NGC) network. The NG BS may connect to the NGC network.

A communication device may be a user equipment (UE), a mobile device, a mobile phone, a laptop, a tablet computer, an electronic book, a portable computer system, a vehicle, a ship or an aircraft.

Figure 2:
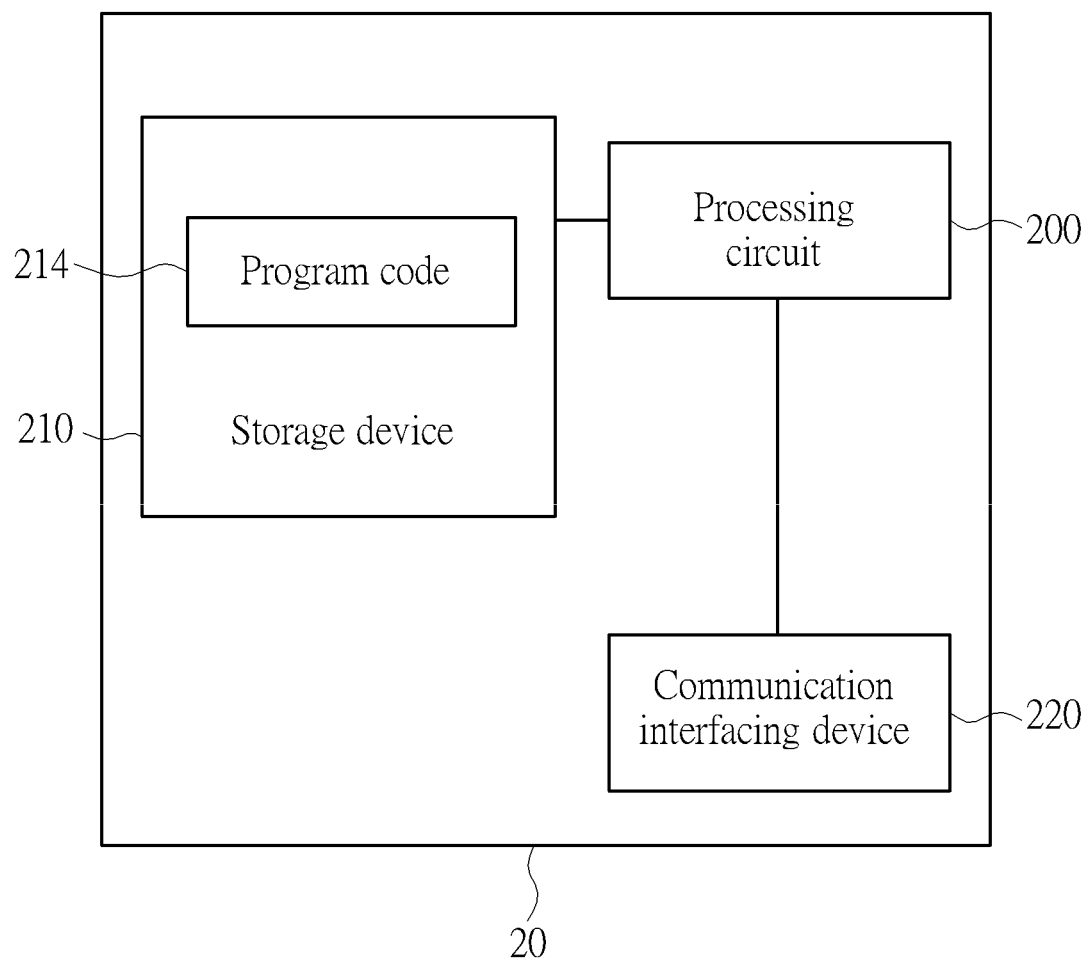
FIG. 2 is a schematic diagram of a communication device according to an example of the present invention.

FIG. 2 is a schematic diagram of a communication device 20 according to an example of the present invention. The communication device 20 may be a communication device or the network (e.g. BS) shown in FIG. 1, but is not limited herein. The communication device 20 may include processing circuit(s) 200 such as microprocessor(s) or Application Specific Integrated Circuit(s), storage device(s) 210 and communication interfacing device(s) 220. The storage device(s) 210 may be any data storage device that may store a program code 214, accessed and executed by the processing circuit 200. Examples of the storage device(s) 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device(s) 220 includes at least one transceiver and is used to transmit and receive signals (e.g., data, messages and/or packets) according to processing results of the processing circuit(s) 200. For example, when the communication device 20 is a BS, the communication interfacing device(s) 220 includes a first communication interfacing device and a second communication interfacing device. The first communication interfacing device is used to transmit and/or receive signals with at least one BS according to processing results of a first processing circuit. The second communication interfacing device is used to transmit and/or receive signals with the communication devices in FIG. 1 according to processing results of the first processing circuit or a second processing circuit.

Figure 3:
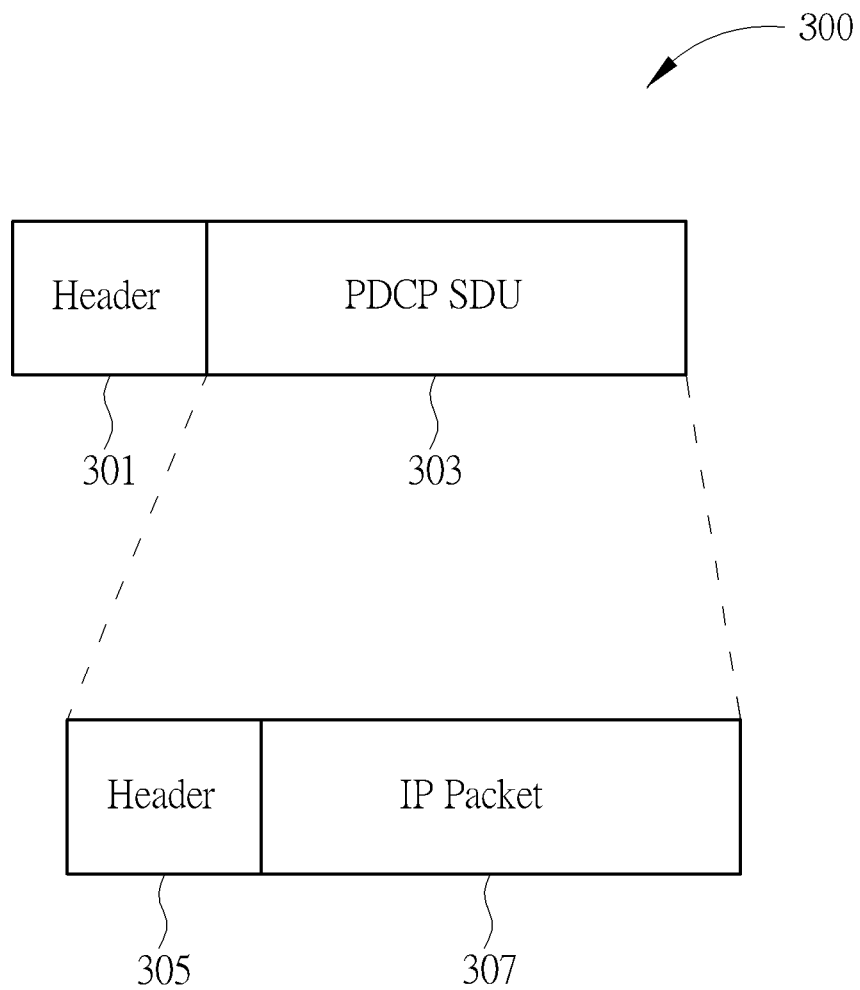
FIG. 3 is a schematic diagram illustrating a PDCP PDU and a PDCP SDU for a next generation network.

FIG. 3 is a schematic diagram illustrating a PDCP PDU and a PDCP SDU for a next generation network. As illustrated in FIG. 3, the PDCP PDU 300 comprises a header 301 and a PDCP SDU 303. The header 301 may comprise, for example, a PDCP SN (sequence number). Also, the PDCP SDU 303 may comprise a header 305 and an IP packet 307. The header 305 may comprise, for example, a flow ID.

Figure 4:
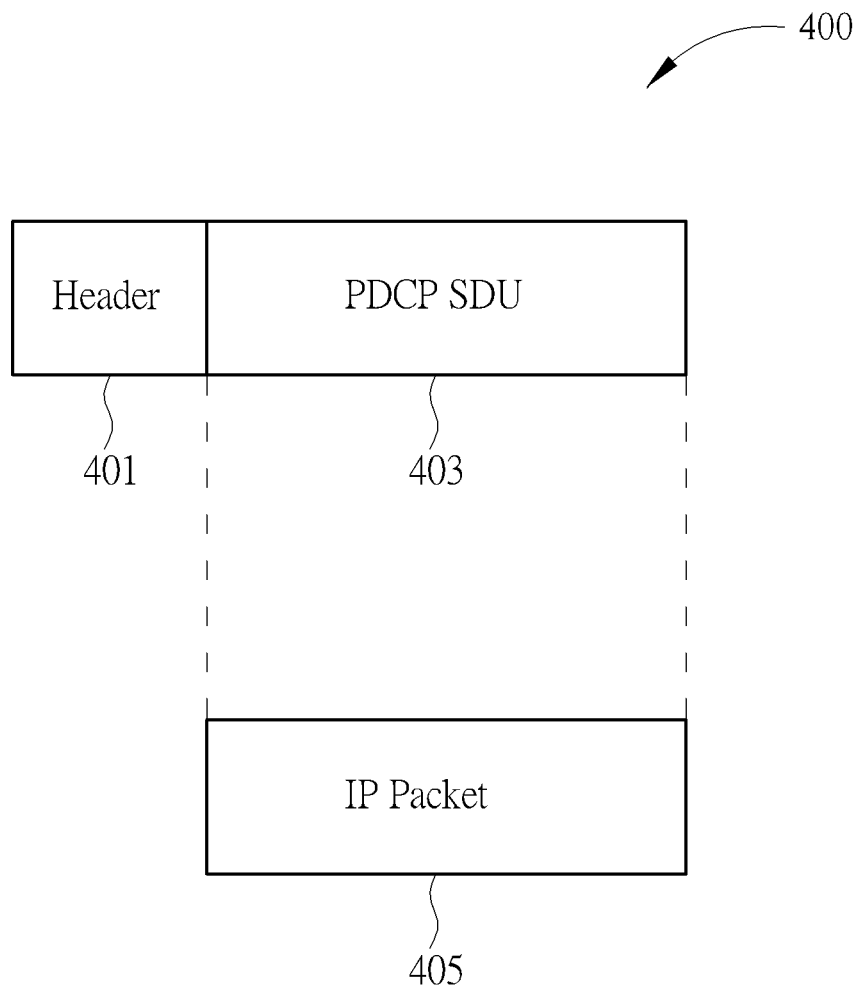
FIG. 4 is a schematic diagram illustrating a PDCP PDU for a LTEW network.

FIG. 4 is a schematic diagram illustrating a PDCP PDU for a LTE network. As illustrated in FIG. 4, similar with the PDCP PDU 300, the PDCP PDU 400 comprises a header 401 and a PDCP SDU 403. However, the PDCP SDU 403 comprises the IP packet 405 but does not comprise a header. Accordingly, if the PDCP SDU 303 is transmitted from the next generation network to the LTE network, the LTE network does need the header 305 thus may not correctly decode the IP packet 307.

Figure 5:
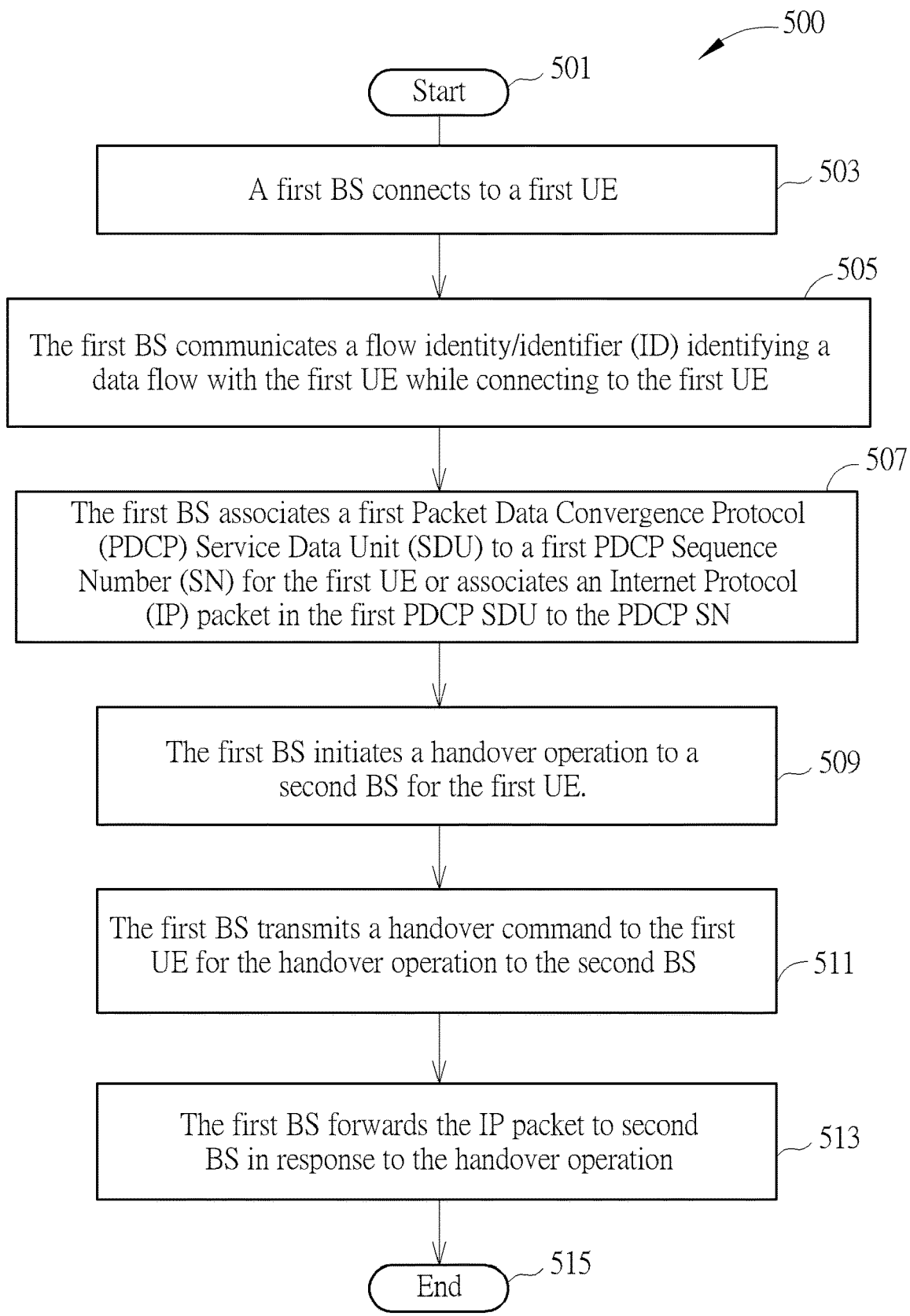
FIG. 5 is a flow chart illustrating one process for the communication device according to one example of the present application.

FIG. 5 is a flow chart illustrating one process 500 for the communication device according to one example of the present application.

In the following descriptions, "UE" is used to represent the communication device in FIG. 1 to simplify the illustration of the embodiments. "BS" is used to represent is used to represent a BS in the network in FIG. 1.

A process 500 illustrated in FIG. 5 comprises the following steps:

Step 501: Start.
Step 503: A first BS connects to a first UE.
Step 505: The first BS communicates a flow identity/identifier (ID) identifying a data flow with the first UE while connecting to the first UE.
Step 507: The first BS associates a first Packet Data Convergence Protocol (PDCP) Service Data Unit (SDU) to a first PDCP Sequence Number (SN) for the first UE or associates an Internet Protocol (IP) packet in the first PDCP SDU to the PDCP SN. The first PDCP SDU includes the flow ID and the IP packet.
Step 509: The first BS initiates a handover operation to a second BS for the first UE.
Step 511: The first BS transmits a handover command to the first UE for the handover operation to the second BS.
Step 513: The first BS forwards the IP packet to second BS in response to the handover operation.
Step 515: End.

According to the process 500, the first BS forwards only part of the first PDCP SDU to the second BS, i.e. the IP packet. The first BS does not forward the complete first PDCP SDU including the flow ID and the IP packet to the second BS. If the first BS forwards the complete first PDCP SDU to the second BS, the second BS transmits the first PDCP SDU in the second PDCP PDU to the first UE. The first UE may incorrectly decode the first PDCP SDU due to the flow ID included in the first PDCP SDU since the first UE may not expect the flow ID in the first PDCP SDU.

Detailed steps for the process 500 are described in following descriptions.

In one example, the first BS may have neither associated the PDCP SDU nor the IP packet to the first PDCP SN when the first BS initiates the handover operation. In this case, the step 507 can be skipped. The first BS may receive the IP packet from the CN.

The second BS may compress the IP packet to a first compressed packet. The second BS may encrypt the IP packet or the first compressed packet to a first encrypted packet. When the second BS connects to the first UE in the handover operation, the second BS transmits a first PDCP Protocol Data Unit (PDU) to the first UE. A data field in the first PDCP PDU includes the IP packet if no compression and encryption are applied, the data field includes the first compressed packet if no encryption is applied, or the data field includes the first encrypted packet if the encryption is applied.

The first UE follows the handover command to perform a handover to a cell of the second BS. The first UE transmits a handover complete to the second BS via the cell. The first BS directly forwards the IP packet to the second BS if the first BS has an interface/connection to the second BS. Otherwise, the first BS forwards the IP packet to the second BS via a core network (CN).

In one example, the first BS connects to a second UE and may initiate a handover operation to (or with) a third BS for the second UE. The first BS transmits a handover command to the second UE for the handover operation. In one example, the first BS forwards a first PDCP SDU to the third BS in response to the handover operation. The third BS may compress the IP packet in the first PDCP SDU to a second compressed packet if the compression is configured by the third BS to the second UE in the handover command. The third BS generates a third PDCP SDU which contains the second compressed packet and the flow ID. The third BS may encrypt the third PDCP SDU to a second encrypted PDCP SDU. When the third BS connects to the second UE according to the handover command, the third BS transmits the third PDCP PDU to the second UE. A data field in the third PDCP PDU includes either the third PDCP SDU or the second encrypted PDCP SDU.

If the header compression is not configured, the third BS may or may not construct a third PDCP SDU which contains the IP packet and the flow ID. If the third BS does not construct the third PDCP SDU, the third BS just reuses the first PDCP SDU. The third BS may encrypt the first/third PDCP SDU to a second encrypted PDCP SDU. When the third BS connects to the second UE according to the handover command, the third BS transmits a third PDCP PDU to the second UE. A data field in the third PDCP PDU includes the second encrypted PDCP SDU.

In the example above, the first BS may forward the IP packet and the flow ID separately (which are not in the format of the first PDCP SDU) to the third BS instead of forwarding the complete first PDCP SDU.

The first BS may or may not transmit the first PDCP SDU in a fourth PDCP PDU to the first/second UE before the handover operation. If the first BS transmits the fourth PDCP PDU to the UE (i.e. the first/second UE, the first BS forwards the IP packet to the second/third BS because the first BS does not receive a message acknowledging the first PDCP SDU or the third PDCP PDU from the UE. The message may be a PDCP status report or a Radio Link Control (RLC) acknowledgement.

The first BS may or may not forward the first PDCP SN to the second/third BS. If the first PDCP SN is forwarded, a SN field in a header of the first PDCP PDU includes the first PDCP SN. Otherwise, the SN field includes a second PDCP SN set by the second/third BS according to transmission order/sequence of the IP packet. The second PDCP SN is irrespective of the first PDCP SN.

The first BS may or may not forward the first PDCP SN to the third BS. If the first PDCP SN is forwarded, a SN field in a header of the second PDCP PDU includes the first PDCP SN. Otherwise, the SN field includes a third PDCP SN set by the third BS according to transmission order/sequence of the second (encrypted) PDCP SDU. The third PDCP SN is irrespective of the first PDCP SN.

In one example, the first BS may forward the first PDCP SN to the third BS and does not forward the first PDCP SN to second BS.

In one example, the first BS may forward the first PDCP SN if the first BS configures a RLC acknowledged mode (AM) for a radio bearer (RB) to which the PDCP SDU belongs/associates, to the UE. In one example, the first BS may not forward the first PDCP SN if the first BS configures a RLC unacknowledged mode (UM) for the radio bearer to which the first PDCP SDU belongs/associates, to the UE. In one example, the first BS may not forward the first PDCP SN in irrespective of the RLC AM or UM configured for the radio bearer.

Figure 6:
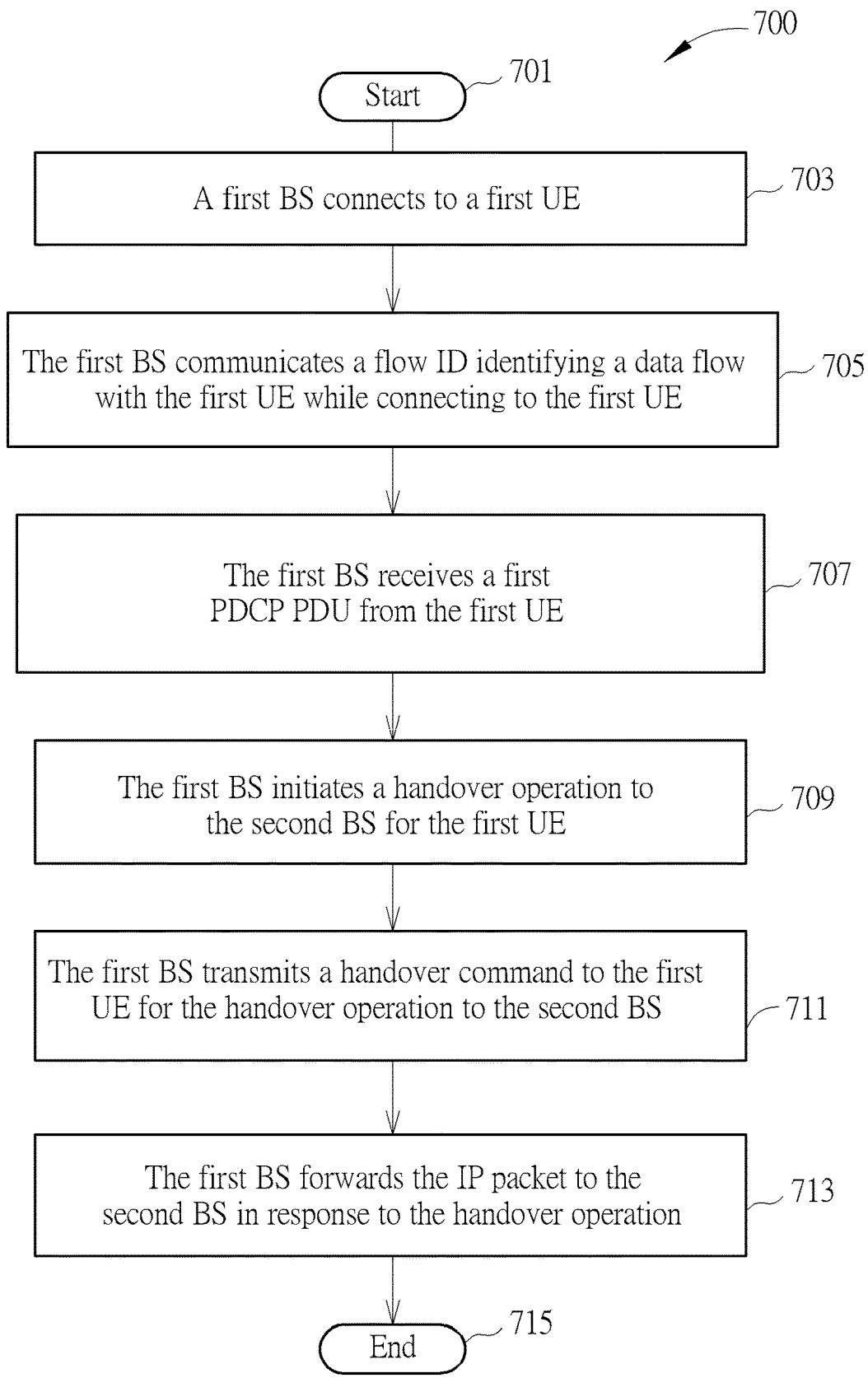
FIG. 6 is a flow chart illustrating one process for the communication device according to another example of the present application.

A process 700 illustrated in FIG. 6 includes the following steps:

Step 701: Start.
Step 703: A first BS connects to a first UE.
Step 705: The first BS communicates a flow ID identifying a data flow with the first UE while connecting to the first UE.
Step 707: The first BS receives a first PDCP PDU from the first UE, wherein the first PDCP PDU includes a first PDCP SDU and a first PDCP SN and the first PDCP SDU includes the flow ID and an IP packet.
Step 709: The first BS initiates a handover operation to the second BS for the first UE.
Step 711: The first BS transmits a handover command to the first UE for the handover operation to the second BS.
Step 713: The first BS forwards the IP packet to the second BS in response to the handover operation.
Step 715: End.

According to the process 700, the first BS forwards only part of the first PDCP SDU to the second BS, i.e. the IP packet. The first BS does not forward the complete first PDCP SDU including the flow ID and the IP packet to the second BS. The second BS may send the IP packet to a CN directly or in a format of a SDU/PDU which is not a PDCP SDU/PDU. If the first BS forwards the complete first PDCP SDU to the second BS, the second BS transmits the first PDCP SDU in the second PDCP PDU to a CN. The CN may incorrectly decode the first PDCP SDU due to the flow ID included in the first PDCP SDU since the CN may not expect the flow ID in the first PDCP SDU.

The process 70 is similar to the process 60. Descriptions for the process 60 may be applied to the process 70.

The first UE follows the handover command to perform a handover to a cell of the second BS. The first UE transmits a handover complete to the second BS via the cell. The first BS directly forwards the IP packet to the second if the first BS has an interface/connection to the second BS. Otherwise, the first BS forwards the IP packet to the second BS via the CN.

In one example, the first BS initiates a handover operation with (or to) a third BS for a second BS. The first BS transmits a handover command to the second BS for the handover operation to the third BS. In one example, the first BS forwards the first PDCP SDU to the third BS in response to the handover operation. The third BS extracts the flow ID and the IP packet from the first PDCP SDU and sends the IP packet to a CN according to the flow ID. In another example, the first BS forwards the IP packet and the flow ID to the third BS. The third BS sends the IP packet to the CN according to the flow ID.

The first BS may or may not forward the first PDCP SN to the second BS. If the first PDCP SN is forwarded, the second BS uses the first PDCP SN for reordering the IP packet. That is, the second BS delivers the IP packet to an upper layer than a PDCP layer in the second BS or sends the IP packet to the CN when the second BS receives second PDCP SDU(s) associated to second SN(s) before the first PDCP SN. Otherwise, the second BS does not reorder the IP packet and just delivers the IP packet to the upper layer or sends the IP packet to the CN.

The first BS may or may not forward the first PDCP SN to the third BS. If the first PDCP SN is forwarded, the third BS uses the first PDCP SN for reordering the first PDCP SDU or the IP packet. That is, the third BS delivers the first PDCP SDU to an upper layer than a PDCP layer in the third BS to process the first PDCP SDU or sends the IP packet to a CN when the third BS receives second PDCP SDU(s) associated to second SN(s) before the first PDCP SN. Otherwise, the third B does not reorder the first PDCP SDU and just delivers the PDCP SDU to the upper layer or sends the IP packet to the CN. A function of the upper layer is to add/remove flow ID to/from the PDCP SDU.

In one example, the first BS may forward the first PDCP SN to the third BS and does not forward the first PDCP SN to second BS.

In one example, the first BS may forward the first PDCP SN if the first base station BS configures RLC AM for a RB to which the first PDCP SDU belongs/associates, to UE. In one example, the first BS may not forward the first PDCP SN if the first BS configures RLC AM for the RB. In one example, the first BS may not forward the first PDCP SN in irrespective of the RLC AM or UM configured for the RB.

Figure 7:
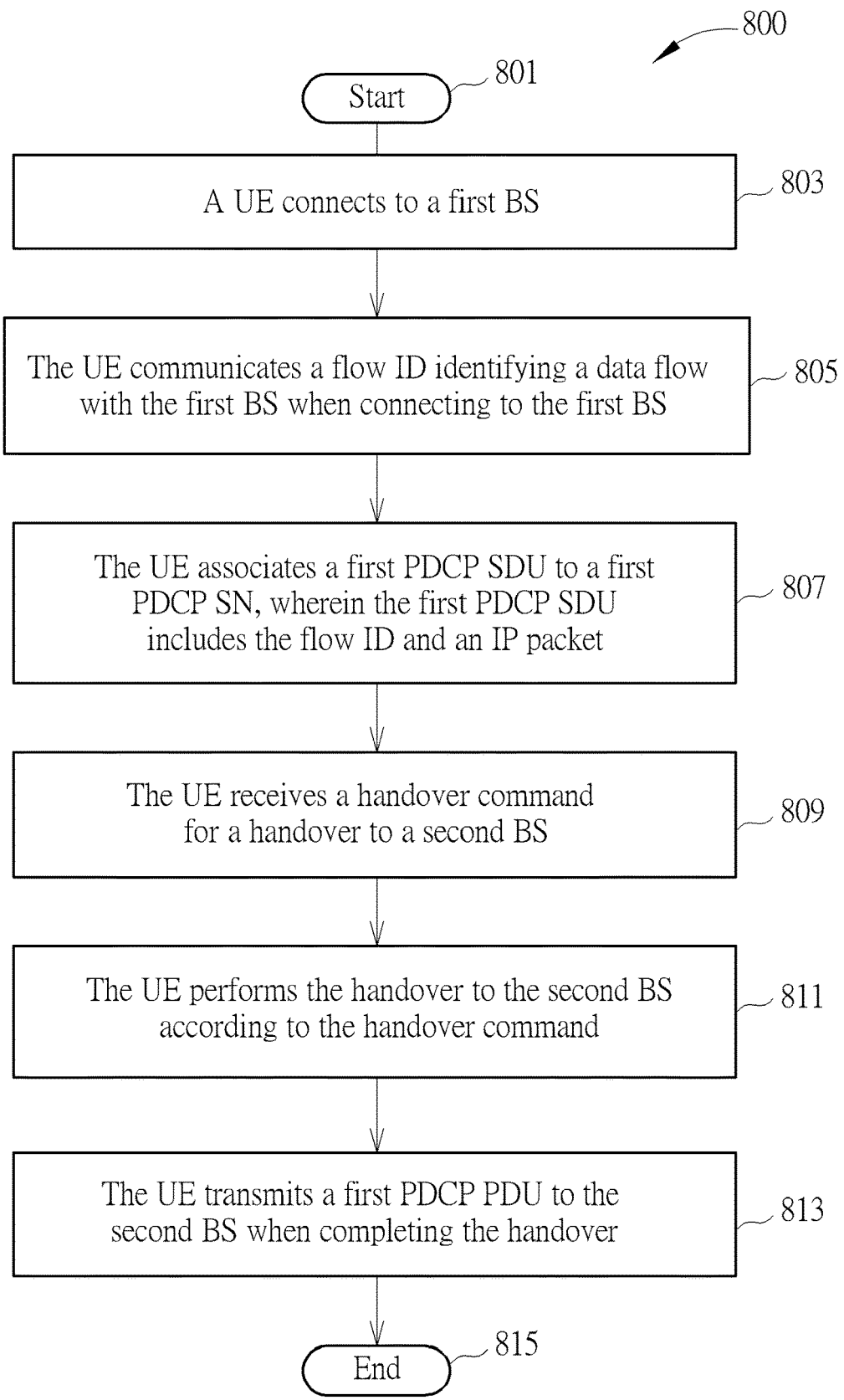
FIG. 7 is a flow chart illustrating one process for the communication device according to still another example of the present application.

A process 800 illustrated in FIG. 7 includes the following steps:

Step 801: Start.
Step 803: A UE connects to a first BS.
Step 805: The UE communicates a flow ID identifying a data flow with the first BS when connecting to the first BS.
Step 807: The UE associates a first PDCP SDU to a first PDCP SN, wherein the first PDCP SDU includes the flow ID and an IP packet.
Step 809: The UE receives a handover command for a handover to a second BS.
Step 811: The UE performs the handover to the second BS according to the handover command.
Step 813: The UE transmits a first PDCP PDU to the second BS when completing the handover, wherein the first PDCP PDU includes the IP packet and does not include the flow ID.
Step 815: End.

The UE may be the first/second UE in the processes above. Examples of the process 500 and 700 may be applied to the process 800. The following examples may be applied to the process 800.

In one example of transmitting the first PDCP PDU, the UE compresses the IP packet to a first compressed packet if the handover command configures compression. In another example, the UE does not compress the IP packet if the handover command does not configure to apply the compression. Then the UE encrypts the IP packet or the first compressed packet to a first encrypted packet, e.g. according to an encryption algorithm configured in the handover command. When the UE connects to the second BS, the UE transmits the first PDCP PDU to the second BS. A data field in the first PDCP PDU includes the IP packet if no compression and encryption are applied, the data field includes the first compressed packet if no encryption is applied, or the data field includes the first encrypted packet if the encryption is applied. Namely the second BS decrypts the first encrypted packet to the IP packet or the first compressed packet when the second BS receives the first PDCP PDU. The second BS decompresses the first compressed packet.

The UE follows the handover command to perform the handover to a cell of the second BS. The UE transmits a handover complete to the second BS via the cell.

In one example, the UE receives a handover command for a handover to a third BS, from the first BS. In one example, the UE compress the IP packet to a second compressed packet if the UE is configured to perform the compression in the handover command. The UE constructs a second PDCP SDU which includes the second compressed packet or the IP packet, and includes the flow ID. That is, the UE does not compress the flow ID in the second PDCP SDU. The UE may encrypt the second PDCP SDU to a second encrypted PDCP SDU. When/after the UE connects to the third BS according to the handover command, the UE transmits a second PDCP PDU to the third BS. A data field in the second PDCP PDU includes either the second encrypted PDCP SDU or the second PDCP SDU depending on the encryption is configured or not.

The UE may or may not transmit the first PDCP SDU in a third PDCP PDU to the first BS before the handover. The third PDCP PDU includes the first PDCP SN. If the UE transmits the third PDCP PDU to the first BS, the UE transmits the first/second PDCP PDU to the second/third BS because the UE does not receive a message acknowledging the first PDCP SDU or the third PDCP PDU from the first BS. The message may be a RLC acknowledgement or a PDCP status report.

The UE may or may not use the first PDCP SN. If the first PDCP SN is used, a SN field in a header of the first PDCP PDU includes the first PDCP SN. Otherwise, the SN field includes a second SN set by the UE according to transmission order/sequence of the first PDCP SDU. The second SN is irrespective of the first PDCP SN.

The UE may or may not use the first PDCP SN. If the first PDCP SN is used, a SN field in a header of the second PDCP PDU includes the first PDCP SN. Otherwise, the SN field includes a second SN set by the UE according to transmission order/sequence of the PDCP SDU. The second SN is irrespective of the PDCP first SN.

In one example, the UE may use the first PDCP SN in the second PDCP PDU and does not use the first PDCP SN in the first PDCP PDU.

In one example, the UE uses the first PDCP SN if the first BS configures a RLC AM for a RB to which the first PDCP SDU belongs/associates, to the UE. In one example, the UE may not use the first PDCP SN if the first BS configures a RLC UM for the radio bearer. In one example, the UE may not use the first PDCP SN in irrespective of the RLC AM or UM configured for the radio bearer.

Realization of the processes above is not limited to the above description. Any of the processes above may be combined. Examples below may be applied to any of the processes above.

The first BS (or the UE) communicates (i.e. transmit and/or receive) the flow ID identifying the data flow with (to and/or from) the UE (or the first BS) while connecting to the UE. The first BS initiates the handover operation with the second/third BS directly if an interface/connection between the first BS and the second/third BS exists. The first BS initiates the handover operation with the second/third BS directly via the CN, otherwise.

The PDCP SDU including the IP packet and the flow ID may be the PDCP SDU 303. The PDCP SDU including the IP packet and no flow ID may be the PDCP SDU 403.

The compression may be a header compression or a data compression. In the header compression, protocol header(s) in the IP packet are compressed. In the data compression, the IP packet (including IP header and data field) may be compressed or only data field of the IP packet is compressed.

The first BS may associate a fourth PDCP SDU or an IP packet to the fourth PDCP SN for the UE, wherein the fourth PDCP SDU includes the flow ID and the IP packet. The UE may or may not compress the IP packet and may encrypt the fourth PDCP SDU, as described above. The first BS may transmit a fifth PDCP PDU including the fourth PDCP SDU to the UE.

The handover command and handover complete may be Radio Resource Control (RRC) messages. For example, the handover command is a RRC Connection Reconfiguration message or a RRC Reconfiguration message. The handover complete message is a RRC Connection Reconfiguration Complete message or a RRC Reconfiguration Complete message.

In one example, the first BS and the third BS are gNBs and the second BS is an eNB. In one example, the first BS and the third BS are evolved LTE (eLTE) NBs and the second BS is an eNB. In one example, the first BS is a gNB, the third BS is an eLTE eNB and the second BS is an eNB. In one example, the first BS is an eLTE eNB, the third BS is a gNB and the second BS is an eNB.

The data flow may be a packet flow or a Quality of Service (QoS) flow. The PDCP SDU(s)/the IP packet(s) belong to the data flow. In one example, the data flow may be an IP packet flow identified by at least one of a source IP address, destination IP address, source port number, destination port number, and transport protocol. In one example, the data flow may include packets matching a traffic flow template (TFT) filter. In one example, the data flow may be associated to a QoS profile which includes a plurality of QoS parameter. The TFT filter and/or the QoS profile may be defined by 3GPP specification(s).

In one example, the first BS or the CN allocates the flow ID to the UE, and the UE receives the flow ID from the first BS or the CN. In one example, the first BS or the CN may transmit a Non-Access Stratum (NAS) message or a RRC message including the flow ID to the UE. In another example, the UE allocates the flow ID, and the first BS or the CN receives the flow ID from the UE. For example, the UE may transmit a NAS message including the flow ID to the first BS or the CN. The RRC message may configure the flow ID is associated to a RB identity (e.g. data RB identity). That is, the data flow is associated to the RB (e.g. data RB).

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20 illustrated in FIG. 2. Any of the above processes and examples above may be compiled into the program code 214.

Based upon above-mentioned embodiments, seamless service continuity for a communication device moving between the two different networks can be provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS), comprising:
at least one storage device, configured to store program codes;
a first communication interfacing device, configured to transmit signals or to receive signals with at least one BS;
a second communication interfacing device, configured to transmit signals or to receive signals with a plurality of user equipments;
at least one processing circuit, coupled to the at least one storage device and the first and second communication interfacing devices, configured to execute the program codes comprising following steps:
(a) associating a first Packet Data Convergence Protocol Service Data Unit (PDCP SDU) to a first PDCP Sequence Number (SN) for a first user equipment, or associating an Internet Protocol (IP) packet in the first PDCP SDU to the first PDCP SN, wherein the first PDCP SDU comprises a flow identity (ID) and the IP packet;
(b) initiating a handover for the first user equipment from the first BS to a second BS; and
(c) when the first PDCP SDU is associated to the first PDCP SN, controlling the first communication interfacing device to forward the IP packet but not to forward the flow ID, to the second BS in response to the handover;
wherein associating the first PDCP SDU to the first PDCP SN enables handover to be performed without forwarding the flow ID.

2. The first BS of claim 1, wherein the program codes further comprises:
(d) initiating a handover for a second user equipment with a third BS; and
(e) controlling the first communication interfacing device to forward a second PDCP SDU for the second user equipment to the third BS in response to the handover, wherein the second PDCP SDU includes a second flow ID and a second IP packet.

3. The first BS of claim 1, wherein the program codes further comprises a following step:
controlling the second communication interfacing device to transmit the flow ID to the first user equipment, before the step (a).

4. The first BS of claim 1, wherein the processing circuit further executes the program code to perform a following step:
controlling the second communication interfacing device to receive the flow ID from the first user equipment, before the step (a).

5. A first base station (BS), comprising:
at least one storage device, configured to store program codes;
a first communication interfacing device, configured to transmit signals or to receive signals with at least one BS;
a second communication interfacing device, configured to transmit signals or to receive signals with a plurality of user equipments;
at least one processing circuit, coupled to the at least one storage device and the first and second communication interfacing devices, configured to execute the program codes comprising following steps:
(a) controlling the second communication interfacing device to receive a first Packet Data Convergence Protocol Service Data Unit (PDCP SDU) from a first user equipment, wherein the first PDCP PDU comprises a first PDCP SDU and a first PDCP Sequence Number (SN), the first PDCP SN is associated to the first PDCP SDU, and the first PDCP SDU comprises a flow identity (ID) and an Internet Protocol (IP) packet;
(b) initiating a handover for the first user equipment with a second BS; and
(c) when the first PDCP PDU is received, controlling the first communication interfacing device to forward the IP packet but not to forward the flow ID, to the second BS in response to the handover;
wherein associating the first PDCP SDU to the first PDCP SN enables handover to be performed without forwarding the flow ID.

6. The first BS of claim 5, wherein the program codes further comprises:

(d) controlling the second communication interfacing device to receive a second PDCP PDU from a second user equipment, wherein the second PDCP PDU comprises a second PDCP SDU and a second PDCP SN, and the second PDCP SDU comprises a second flow ID and a second IP packet;

(e) initiating a handover for the second user equipment with a third BS; and (f) controlling the first communication interfacing device to forward the second flow ID and the second IP packet for the second user equipment to the third BS in response to the handover.

7. The first BS of claim 5, wherein the program codes further comprises a following step:

controlling the second communication interfacing device to transmit the flow ID to the first user equipment, before the step (a).

8. The first BS of claim 5, wherein the program codes further comprise a following step:

controlling the second communication interfacing device to receive the flow ID from the first user equipment, before the step (a).

9. A user equipment capable of communicating with a first base station (BS) and a second BS, comprising:

a storage device, configured to store program codes;

a communication interfacing device, configured to transmit signals or to receive signals;

a processing circuit, coupled to the storage device and the communication interfacing device, configured to execute the program codes comprising following steps:

(a) associating a first Packet Data Convergence Protocol Service Data Unit (PDCP SDU) to a first PDCP Sequence Number (SN), wherein the first PDCP SDU comprises a flow identity (ID) and an Internet Protocol (IP) packet;

(b) controlling the communication interfacing unit to receive a handover command to hand over from the first BS to the second BS; and (c) when the first PDCP SDU is associated to the first PDCP SN, controlling the communication interfacing device to transmit a first PDCP PDU to the second BS when handing over to the second BS according to the handover command, wherein the first PDCP PDU comprises the IP packet but does not comprise the flow ID;

wherein associating the first PDCP SDU to the first PDCP SN enables handover to be performed without forwarding the flow ID.

10. The user equipment of claim 9, wherein the program codes further comprise a following step:

controlling the communication interfacing unit to transmit the flow ID to the first BS, before the step (a).

11. The user equipment of claim 9, wherein the program codes comprise a following step:

controlling the communication interfacing unit to receive the flow ID from the first BS, before the step (a).

* * * * *